US008423280B2

(12) United States Patent
Edwards et al.

(10) Patent No.: US 8,423,280 B2
(45) Date of Patent: Apr. 16, 2013

(54) VEHICLE COLLISION AVOIDANCE SYSTEM

(75) Inventors: David Edwards, Dunlap, IL (US);
David Robert Pavlik, Peoria, IL (US);
Ramkumar Subramanian, Peoria, IL
(US); Robert Martin Coats, Peoria, IL
(US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/572,279

(22) Filed: Aug. 10, 2012

(65) Prior Publication Data

US 2013/0027559 A1  Jan. 31, 2013

Related U.S. Application Data

(63) Continuation of application No. 12/081,350, filed on Apr. 15, 2008, now Pat. No. 8,280,621.

(51) Int. Cl.
*G06F 17/10* (2006.01)
*B60Q 1/00* (2006.01)
*G01S 13/00* (2006.01)

(52) U.S. Cl.
USPC ............................. 701/301; 340/435; 342/70

(58) Field of Classification Search ............. 701/301;
340/436, 3.41, 903, 961; 342/43–51, 65–66,
342/69, 76, 77, 94–97, 104–118, 126, 139,
342/146, 147–158, 41, 455, 29; 713/324–340;
180/232; 280/777; 345/958; 367/909; 398/36;
700/255
See application file for complete search history.

(56) References Cited

U.S. PATENT DOCUMENTS

| | | | |
|---|---|---|---|
| 3,898,652 A | 8/1975 | Rashid | |
| 5,091,726 A | 2/1992 | Shyu | |
| 5,194,734 A | 3/1993 | Whittaker et al. | |
| 5,239,310 A | 8/1993 | Meyers et al. | |
| 5,249,157 A | 9/1993 | Taylor | |
| 5,307,136 A | 4/1994 | Saneyoshi | |
| 5,314,037 A | 5/1994 | Shaw et al. | |
| 5,529,138 A * | 6/1996 | Shaw et al. | 180/169 |
| 5,610,815 A | 3/1997 | Gudat et al. | |
| 5,757,501 A | 5/1998 | Hipp | |
| 5,982,278 A | 11/1999 | Cuvelier | |
| 6,055,042 A | 4/2000 | Sarangapani | |
| 6,067,110 A | 5/2000 | Nonaka et al. | |
| 6,089,207 A * | 7/2000 | Goode et al. | 123/357 |
| 6,157,294 A | 12/2000 | Urai et al. | |
| 6,172,601 B1 | 1/2001 | Wada et al. | |

(Continued)

OTHER PUBLICATIONS

PreView—Collision Warning, "Overview," (http://www.preco.com/PreView/) (printed Feb. 19, 2008) (1 page).

(Continued)

*Primary Examiner* — James Trammell
*Assistant Examiner* — Muhammad Shafi
(74) *Attorney, Agent, or Firm* — Finnegan, Henderson, Farabow, Garrett & Dunner LLP

(57) ABSTRACT

A method for collision avoidance for a machine is disclosed. The method includes detecting an obstacle with an obstacle detection system and generating a corresponding signal. The obstacle detection system includes an operator input device. The method also includes providing an obstacle detection warning in response to the signal. The method further includes determining with a controller whether the operator input device has been activated in response to the obstacle detection warning.

13 Claims, 9 Drawing Sheets

U.S. PATENT DOCUMENTS

| | | | |
|---|---|---|---|
| 6,222,447 | B1 | 4/2001 | Schofield et al. |
| 6,226,572 | B1 | 5/2001 | Tojima et al. |
| 6,275,773 | B1 | 8/2001 | Lemelson et al. |
| 6,370,475 | B1 | 4/2002 | Breed et al. |
| 6,389,785 | B1 | 5/2002 | Diekhans et al. |
| 6,480,789 | B2 | 11/2002 | Lin |
| 6,483,429 | B1 | 11/2002 | Yasui et al. |
| 6,487,481 | B2 | 11/2002 | Tanaka et al. |
| 6,487,500 | B2 | 11/2002 | Lemelson et al. |
| 6,727,844 | B1 | 4/2004 | Zimmermann et al. |
| 6,873,251 | B2 | 3/2005 | Schiffmann et al. |
| 6,937,375 | B2 | 8/2005 | Schanz |
| 7,012,560 | B2 | 3/2006 | Braeuchle et al. |
| 7,057,532 | B2 | 6/2006 | Shafir et al. |
| 7,110,021 | B2 | 9/2006 | Nobori et al. |
| 7,149,648 | B1 | 12/2006 | Hreha |
| 7,158,015 | B2 | 1/2007 | Rao et al. |
| 7,187,445 | B2 | 3/2007 | Schanz et al. |
| 7,248,153 | B2 | 7/2007 | Danz et al. |
| 7,798,578 | B2 * | 9/2010 | Lewis et al. .................... 303/151 |
| 2005/0017857 | A1 * | 1/2005 | Rao et al. ...................... 340/435 |
| 2005/0137774 | A1 | 6/2005 | Rupp |
| 2006/0290482 | A1 * | 12/2006 | Matsumoto et al. .......... 340/436 |
| 2009/0045928 | A1 * | 2/2009 | Rao et al. ...................... 340/435 |
| 2009/0259399 | A1 | 10/2009 | Kotejoshyer et al. |

OTHER PUBLICATIONS

PreView—Models, "Models," (http://www.preco.com/PreView/Models/index.htm) (printed Feb. 19, 2008) (1 page).

PreView—Technology, "Technology," (http://www.preco.com/PreView/technology.htm) (printed Feb. 19, 2008) (1 page).

S.A.S.—Safety Alert Systems, "Overview," (http://www.preco.com/PreView/SAS/index.htm) (printed Feb. 19, 2008) (2 pages).

PreView—Standard, "Standard Preview," (http://www.preco.com/PreView/Models/Standard/index.htm) (printed Feb. 19, 2008) (1 page).

PreView—Standard—Applications, "Standard Preview—Applications," (http://www.preco.com/PreView/Models/Standard/Application.htm) (printed Feb. 19, 2008) (1 page).

PreView—Standard—Performance, "Standard Preview—Performance," (http://www.preco.com/PreView/Models/Standard/Performance.htm) (printed Feb. 19, 2008) (2 pages).

PreView—Standard—Performance, "Standard Preview—Specifications," (http://www.preco.com/PreView/Models/Standard/Specifications.htm) (printed Feb. 19, 2008) (2 pages).

"Standard PreView Operating Manual/Installation Guide," (http://www.preco.com/Documents/Instruction/PreView/pv-st-3708941b.pdf) (printed Feb. 19, 2008) (11 pages).

PreView—Heavy-Duty, "Heavy-Duty Preview," (http://www.preco.com/PreView/Models/Heavy-Duty/index.htm) (printed Feb. 19, 2008) (1 page).

PreView—Standard—Applications, "Heavy-Duty Applications," (http://www.preco.com/PreView/Models/Heavy-Duty/Application.htm) (printed Feb. 19, 2008) (1 page).

PreView—Standard—Applications, "Heavy-Duty—Performance," (http://www.preco.com/PreView/Models/Heavy-Duty/Performance.htm) (printed Feb. 19, 2008) (2 pages).

PreView—Standard—Applications, "Heavy-Duty—Specifications," (http://www.preco.com/PreView/Models/Heavy-Duty/Specifications.htm) (printed Feb. 19, 2008) (2 pages).

"Heavy Duty Preview Operating Manual/Installation Guide," (http://www.preco.com/Documents/Instructions/PreView/pv-hd-3708711c.pdf) (printed Feb. 19, 2008) (18 pages).

Preco Vehicle Communication Systems, Case Study—Idaho Sand & Gravel, Idaho Concrete Company, "How S.A.S. Reduced Noise and Increased Safety," (http://www.preco.com/Documents/brochures/PV-CS-SAS-002_-.pdf) (Feb. 2006) (3 pages).

Preco Vehicle Communication Systems, Case Study—Environmental Earthworks, "How S.A.S. Improved Operator Awareness and Public Safety," (http://www.preco.com/Documents/brochures/PV-CS-SAS-001_-.pdf) (Oct. 2005) (3 pages).

Preco Vehicle Communication Systems, Preview, "Collision Warning Systems," (http://www.preco.com/Documents/brochures/PV-FL-ONR-001_-.pdf) (Oct. 2005) (3 pages).

Preco Vehicle Communication Systems, Preview, "Collision Warning Systems," (http://www.preco.com/Documents/brochures/PV-FL-OFF-001_-.pdf) (Oct. 2005) (3 pages).

Preco Vehicle Communication Systems, S.A.S., "Safety Alert Systems Preview," (http://www.preco.com/Documents/brochures/PV-FL-SAS-OFF-001_-.pdf) (Feb. 2008) (3 pages).

Preco Vehicle Communication Systems, Press Release, "Preco Supplies Advanced Object Sensor for Safety Braking Systems," (http://www.preco.com/Documents/brochures/Press-Preco_MICO_092505.pdf) (Sep. 25, 2005) (2 pages).

* cited by examiner

VEHICLE COLLISION AVOIDANCE SYSTEM

This is a continuation of application Ser. No. 12/081,350 filed Apr. 15, 2008, now U.S. Pat. No. 8,280,621 the disclosure of which is incorporated herein by reference.

TECHNICAL FIELD

The present disclosure relates generally to a collision avoidance system and, more particularly, to a system for avoiding vehicle collisions.

BACKGROUND

Large machines such as, for example, wheel loaders, off-highway haul trucks, excavators, motor graders, and other types of earth-moving machines are used to perform a variety of tasks. Some of these tasks involve intermittently moving between and stopping at certain locations within a worksite and, because of the poor visibility provided to operators of the machines, these tasks can be difficult to complete safely and effectively. In fact, it is not uncommon for obstacles, such as light duty vehicles, to move and stop near the machine completely unnoticed by the operator. When an obstacle remains unnoticed, the machine may move toward and collide with the obstacle. This collision may necessitate an accident investigation. During this accident investigation, the machine may be taken out of service, thereby reducing the productivity and efficiency of the worksite.

One way to minimize the effect of obstacles near a machine is described in U.S. Pat. No. 6,487,500 (the '500 patent) issued to Lemelson et al. on Nov. 26, 2002. The '500 patent describes a vehicle equipped with a collision avoidance warning and control system. The collision avoidance warning and control system includes GPS location and computing systems supplemented by additional sensors including video scanners, radars/lidars, speedometers, and/or accelerometers. Together with the GPS location and computing systems, these sensors output vehicle location information and information concerning objects that represent impending collision situations for the vehicle. Onboard vehicle fuzzy logic/expert system computing algorithms use these outputs to derive warning and control signals. Based on the warning signals, a video display highlights hazards on real time camera images and displays special warning images such as flashing lights, alpha-numeric messages, distance values, and speed indicators. Based on the control signals, a brake system, acceleration system, steering system, communications system, horn, light, windshield wiper, seat, mirror, air conditioner, heater, and/or defogger is operated to avoid or minimize the effect of a collision.

Although the collision avoidance warning and control system of the '500 patent may detect objects that represent impending collision situations for a vehicle, it may do little to detect obstacles that are relatively motionless with respect to the vehicle. Furthermore, though the collision avoidance warning and control system of the '500 patent may warn an operator of an impending collision situation, it may do little to ensure a vehicle operator recognizes and/or acknowledges the situation. In addition, though the expert system computing algorithms of the '500 patent may derive control signals designed to avoid or minimize the effect of vehicle collisions, the expert system computing algorithms may be unnecessary and prohibitively expensive for certain applications. In particular, the expert system computing algorithms of the '500 patent may necessitate more powerful computing hardware, thereby substantially increasing the system's cost while providing what may be a marginal benefit.

The disclosed system is directed to overcoming one or more of the problems set forth above.

SUMMARY

In one aspect, the present disclosure is directed to a method for collision avoidance for a machine. This method may include detecting an obstacle with an obstacle detection system and generating a corresponding signal. The obstacle detection system may include an operator input device. The method may also include providing an obstacle detection warning in response to the signal. The method may further include, determining with a controller whether the operator input device has been activated in response to the obstacle detection warning.

In another aspect, the present disclosure is directed to a method for collision avoidance for a machine. The method may include detecting an obstacle with an obstacle detection system and generating a corresponding signal. The obstacle detection system may include an operator input device. The method may also include providing an obstacle detection warning in response to the signal, wherein providing the obstacle detection warning includes displaying a graphic on a first portion of a display. The method may further include capturing images of the obstacle with a camera and displaying the images on a second portion of the display. The method may also include determining with a controller whether the operator input device has been activated in response to the obstacle detection warning.

DETAILED DESCRIPTION

Figure 1:
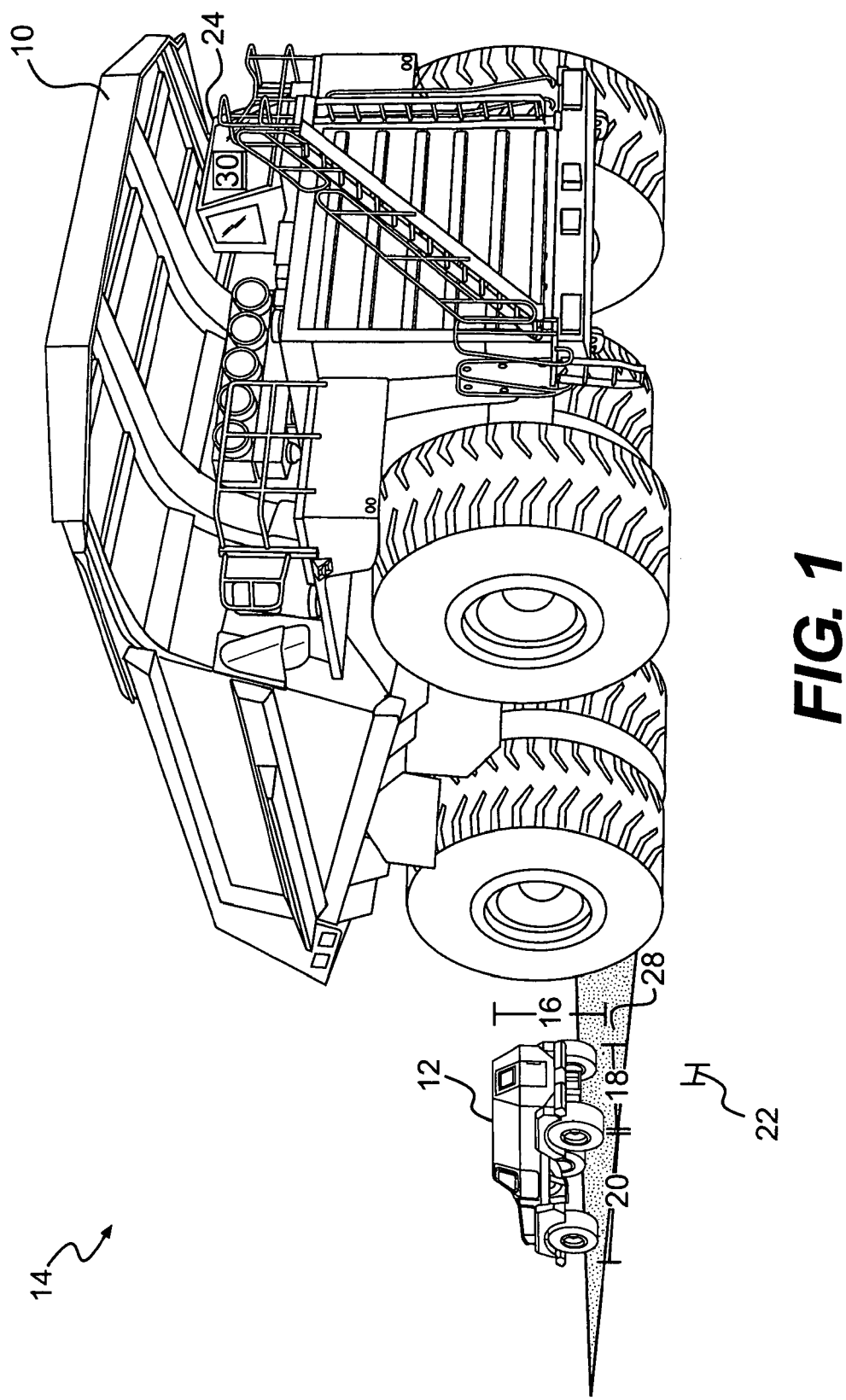
FIG. 1 is a pictorial illustration of an exemplary disclosed machine.

FIG. 1 illustrates an exemplary machine 10 and an obstacle 12 of machine 10, both located at a worksite 14. Although machine 10 is depicted as an off-highway haul truck, it is contemplated that machine 10 may embody another type of large machine, for example, a wheel loader, an excavator, or a motor grader. Obstacle 12 is depicted as a service vehicle. But, it is contemplated that obstacle 12 may embody another type of obstacle, for example, a pick-up truck, or a passenger car. If obstacle 12 is at least a certain size, obstacle 12 may be classified as dangerous. For example, the certain size may be a length 22. If obstacle 12 has a height 16 longer than a length 22, a width 18 longer than length 22, or a depth 20 longer than length 22, obstacle 12 may be classified as dangerous. Alternatively, obstacle 12 may be classified as dangerous for another reason. For example, obstacle 12 may be classified as dangerous if it has a stable RADAR return (i.e. if it is detected at one range for more than a certain period of time). Worksite 14 may be, for example, a mine site, a landfill, a quarry, a construction site, or another type of worksite known in the art.

Machine 10 may have an operator station 24, which may be situated to minimize the effect of blind spots of machine 10 (i.e. maximize the unobstructed area viewable by an operator or operators of machine 10 (hereafter "operator")). But, because of the size of some machines, these blind spots may still be large. For example, dangerous obstacle 12 may reside completely within a blind spot 28, which may or may not be viewable by the operator. To avoid collisions with dangerous obstacle 12, machine 10 may be equipped with a collision avoidance system 29 (referring to FIG. 2). Collision avoidance system 29 may include a controller 30 to gather information about obstacle 12 within blind spot 28.

Figure 2:
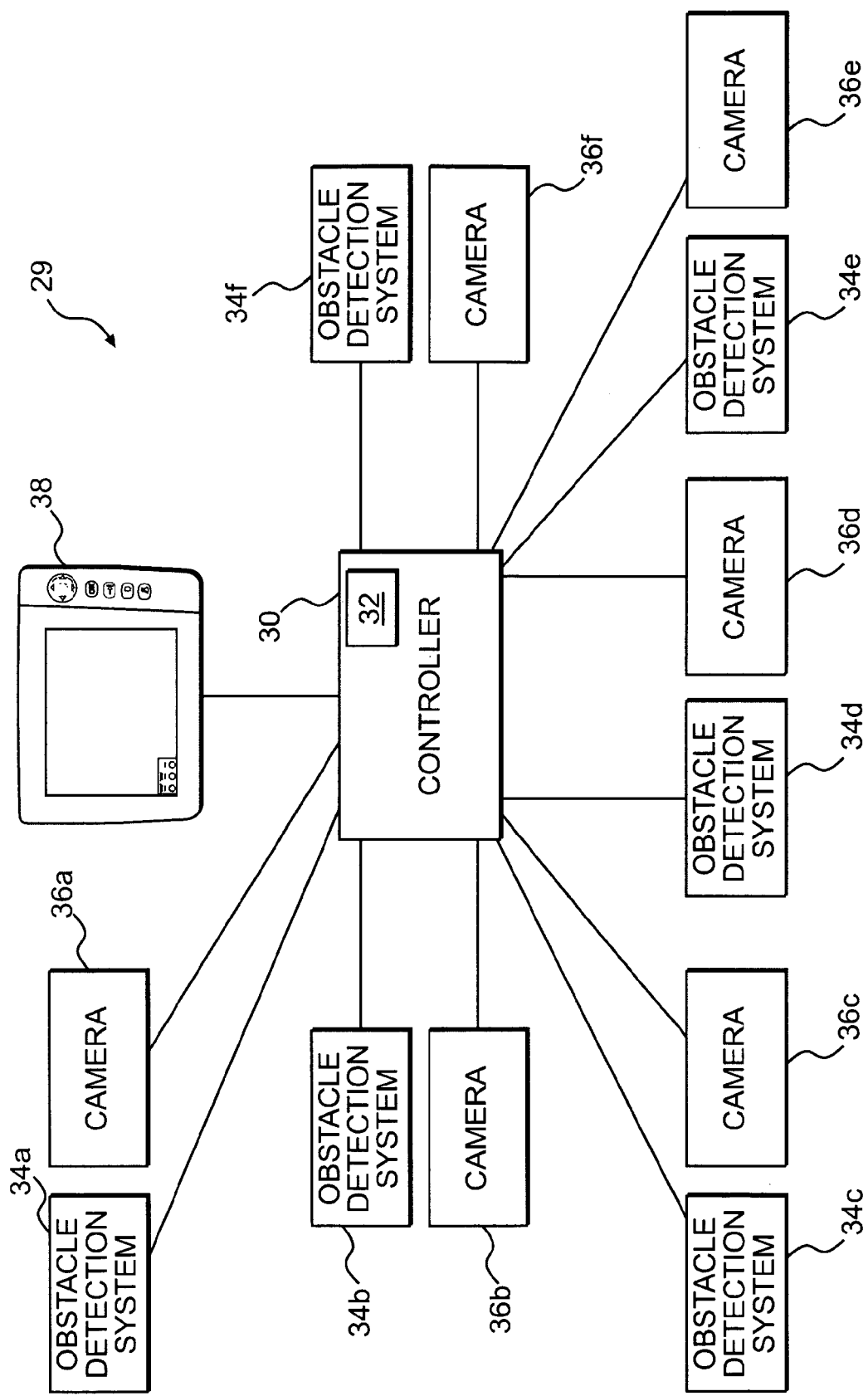
FIG. 2 is a diagrammatic illustration of an exemplary disclosed control system for use with the machine of FIG. 1.

Controller 30 may be associated with operator station 24, or another protected assembly of machine 10. As illustrated in FIG. 2, controller 30 may include a map 32 to store information about dangerous obstacle 12 detections within blind spot 28. Controller 30 may update map 32 to reflect current dangerous obstacle 12 detections by communicating with an obstacle detection system 34. Controller 30 may also communicate with a camera 36 to capture images of blind spot 28. Controller 30 may display these images and/or a visual representation of map 32 to the operator via an operator interface 38. Additionally, controller 30 may use operator interface 38 to provide a dangerous obstacle 12 warning to the operator, and acknowledge the operator's recognition of this warning.

Controller 30 may include means for monitoring, recording, storing, indexing, processing, and/or communicating information. These means may include, for example, a memory, one or more data storage devices, a central processing unit, and/or another component that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM.

Figure 3:
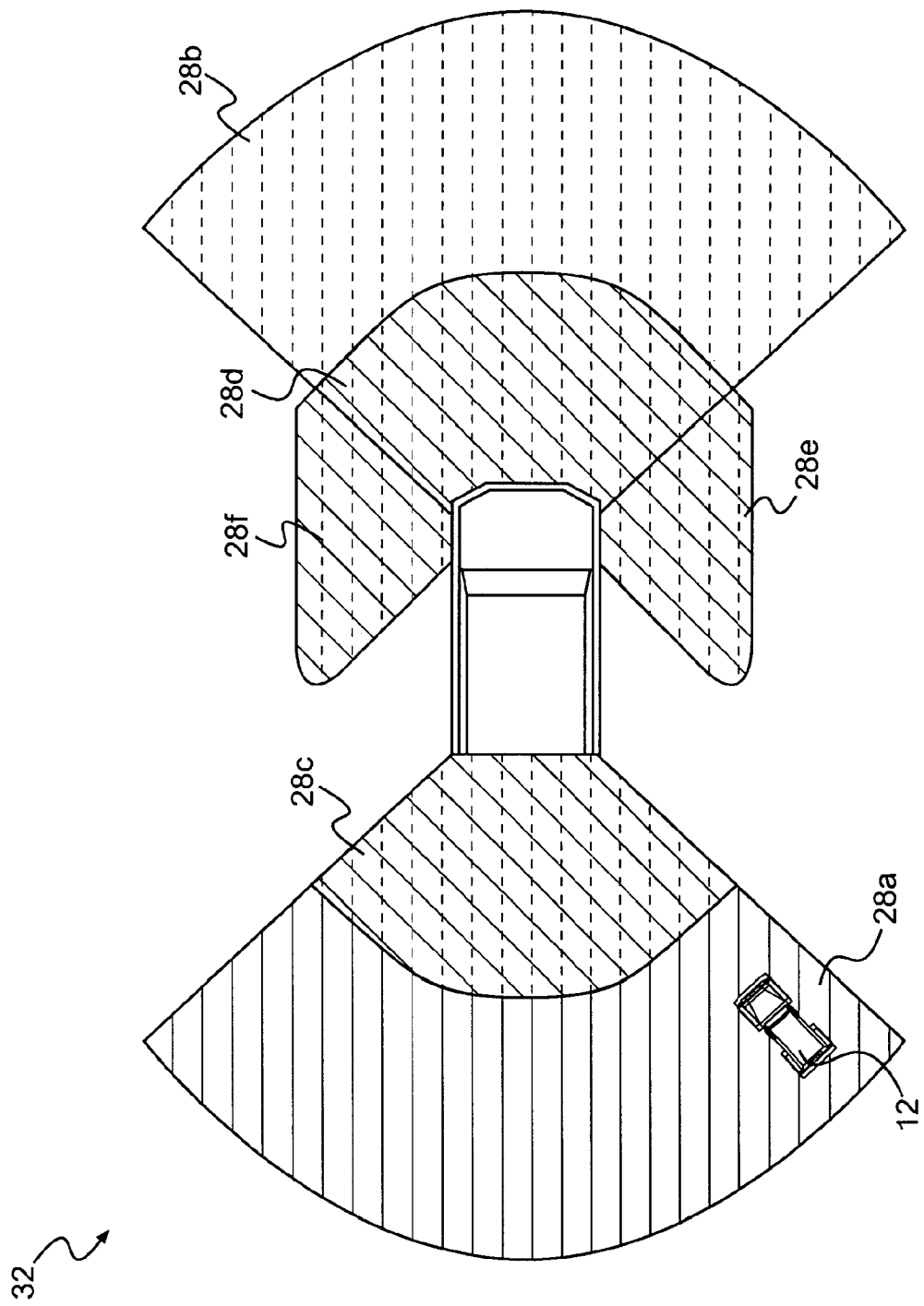
FIG. 3 is a pictorial illustration of an exemplary disclosed map for use with the control system of FIG. 2.

Map 32 may be electronic in form, and may be stored in the memory of controller 30. As previously discussed, map 32 may be updated in real time to reflect current dangerous obstacle 12 detections. It is contemplated that map 32 may store a set of detection values representing dangerous obstacle 12 detections within one or more blind spots 28. It is further contemplated that map 32 may be visually represented. For example, as illustrated in FIG. 3, the set of detection values may represent dangerous obstacle 12 detections within each of blind spots 28a, 28b, 28c, 28d, 28e, and 28f. It is also contemplated that map 32 may store a set of criticality values representing how threatening dangerous obstacle 12 within each of blind spots 28a, 28b, 28c, 28d, 28e, and 28f may be. For example, dangerous obstacle 12 within blind spots 28c, 28d, 28e, and 28f may be more threatening than dangerous obstacle 12 within blinds spots 28a and 28b because blind spots 28c, 28d, 28e, and 28f may be closer to machine 10. Table 1 represents a possible set of detection values and a possible set of criticality values as stored in controller 30.

TABLE 1

| Blind Spot | Detection Value | Criticality Value |
|---|---|---|
| 28a | 1 | 0 |
| 28b | 0 | 0 |
| 28c | 0 | 1 |
| 28d | 0 | 1 |
| 28e | 0 | 1 |
| 28f | 0 | 1 |

Both detection values and criticality values may be binary. For example, detection value 1 may correspond to a dangerous obstacle 12 detection (i.e. dangerous obstacle 12 presence), while detection value 0 may correspond to a dangerous obstacle 12 non-detection (i.e. dangerous obstacle 12 absence). And, criticality value 1 may correspond to a blind spot 28 within which obstacle 12 is threatening, while criticality value 0 may correspond to a blind spot 28 within which obstacle 12 is not threatening. In FIG. 3, detection value 1 is represented by horizontal solid-line crosshatching, while detection value 0 is represented by horizontal dotted-line crosshatching. And, criticality value 1 is represented by diagonal solid-line crosshatching, while criticality value 0 is represented by the absence of diagonal crosshatching.

Each blind spot 28 may be associated with one obstacle detection system 34, which may detect dangerous obstacle 12 and, through communication with controller 30, update map 32 accordingly. Each blind spot 28 may also be associated with one camera 36, which may capture images of blind spot 28 and, via operator interface 38, display these images to the operator. Table 2 represents one possible set of associations between blind spots 28, obstacle detection systems 34, and cameras 36. Each row of Table 2 represents a 3-way association between one blind spot 28, one obstacle detection system 34, and one camera 36.

TABLE 2

| Blind Spot | Obstacle Detection System | Camera |
|---|---|---|
| 28a | 34a | 36a |
| 28b | 34b | 36b |
| 28c | 34c | 36c |
| 28d | 34d | 36d |
| 28e | 34e | 36e |
| 28f | 34f | 36f |

Alternatively, each blind spot 28 may be associated with more than one obstacle detection system 34 and/or more than one camera 36. In yet another alternative, more than one blind spot 28 may share one camera 36 and/or one obstacle detection system 34. For example, blind spots 28a and 28c may share one camera 36. This camera 36 may hereafter be referred to as camera 36a or camera 36c. Additionally, blind spots 28b and 28d may share one camera 36. This camera 36 may hereafter be referred to as camera 36b or camera 36d.

Figure 4:
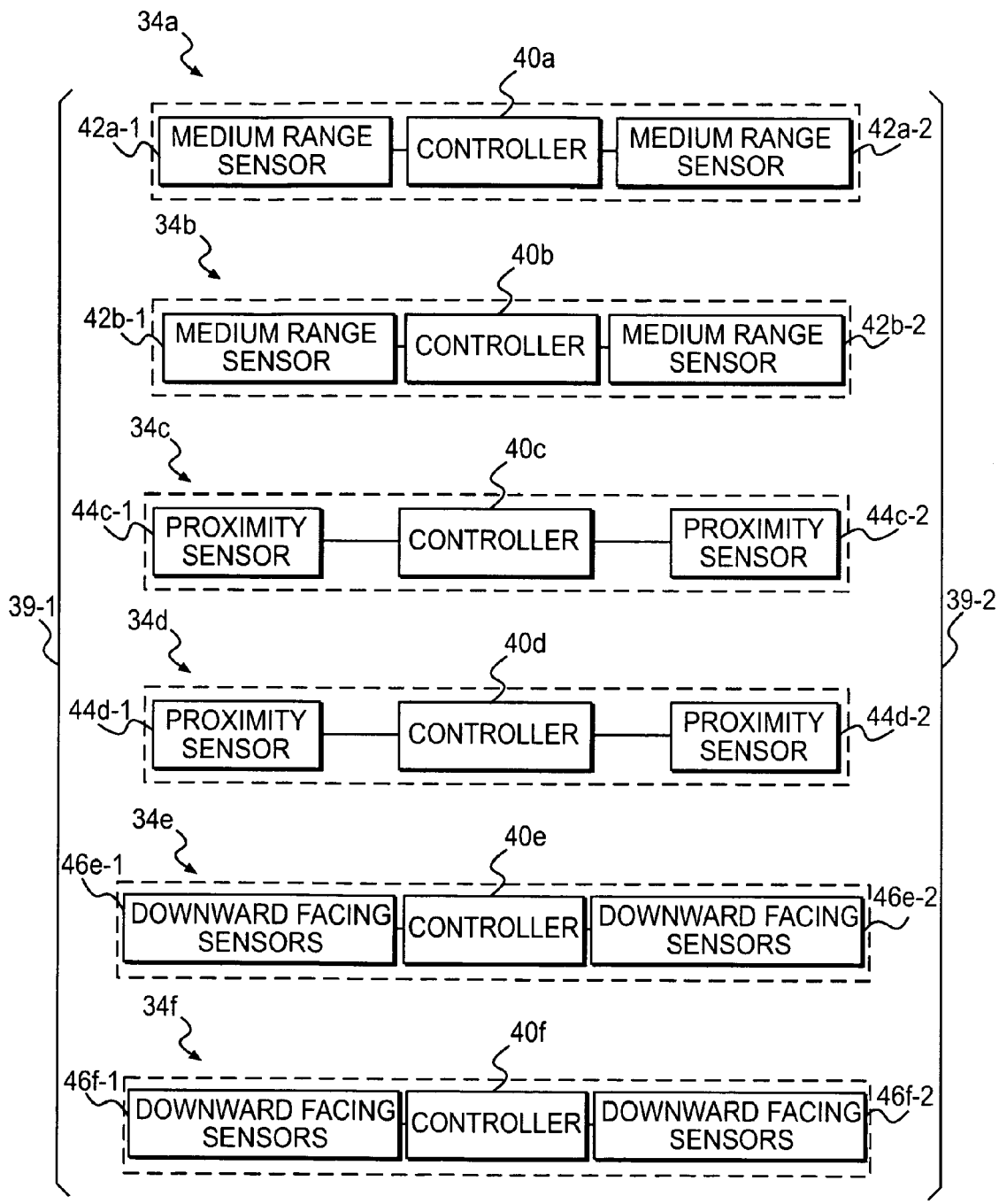
FIG. 4 is a diagrammatic illustration of exemplary disclosed obstacle detection systems for use with the control system of FIG. 2.

Referring to FIG. 4, each obstacle detection system 34 may include an obstacle sensor 39, or a plurality thereof, to detect points on surfaces within its associated blind spot 28. For example, obstacle detection system 34 may include a first obstacle sensor 39-1 and a second obstacle sensor 39-2. Obstacle sensor 39-1 may detect points that are on surfaces facing it (i.e. points within a line of sight of obstacle sensor 39-1). And, obstacle sensor 39-2 may detect points that are on surfaces facing it (i.e. points within a line of sight of obstacle sensor 39-2). Detections of points by obstacle sensors 39-1 and 39-2 may be raw (i.e. not directly comparable). Therefore, each obstacle detection system 34 may also include a controller 40, which may receive communications including the detections of points from obstacle sensors 39-1 and 39-2 (i.e. obstacle 12 detections), respectively, and then transform, filter, and/or unionize the detections. Each controller 40 may also generate and communicate to controller 30 a signal corresponding to these transformed, filtered, and/or unionized detections (i.e. dangerous obstacle 12 detections). Alternatively, it is contemplated that each obstacle detection system 34 may embody a single integrated component that may detect obstacles 12, determine whether obstacles 12 are dangerous, and communicate dangerous obstacle 12 detections to controller 30. For example, obstacle detection system 34 may embody a motion detector, an RFID detector, or a GPS tracking system.

It is contemplated that obstacle sensors 39 may vary in form. For example, each obstacle sensor 39 may embody a medium range sensor 42, a proximity sensor 44, a downward facing sensor 46, or another sensor that may detect points on surfaces. Table 3 represents exemplary configurations of each obstacle detection system 34.

TABLE 3

| Obstacle Detection System | Controller | Medium Range Sensor(s) | Proximity Sensor(s) | Downward Facing Sensor(s) |
|---|---|---|---|---|
| 34a | 40a | 42a-1 and 42a-2 | None | None |
| 34b | 40b | 42b-1 and 42b-2 | None | None |
| 34c | 40c | None | 44c-1 and 44c-2 | None |
| 34d | 40d | None | 44d-1 and 44d-2 | None |
| 34e | 40e | None | None | 46e-1 and 46e-2 |
| 34f | 40f | None | None | 46f-1 and 46f-2 |

Figure 5:
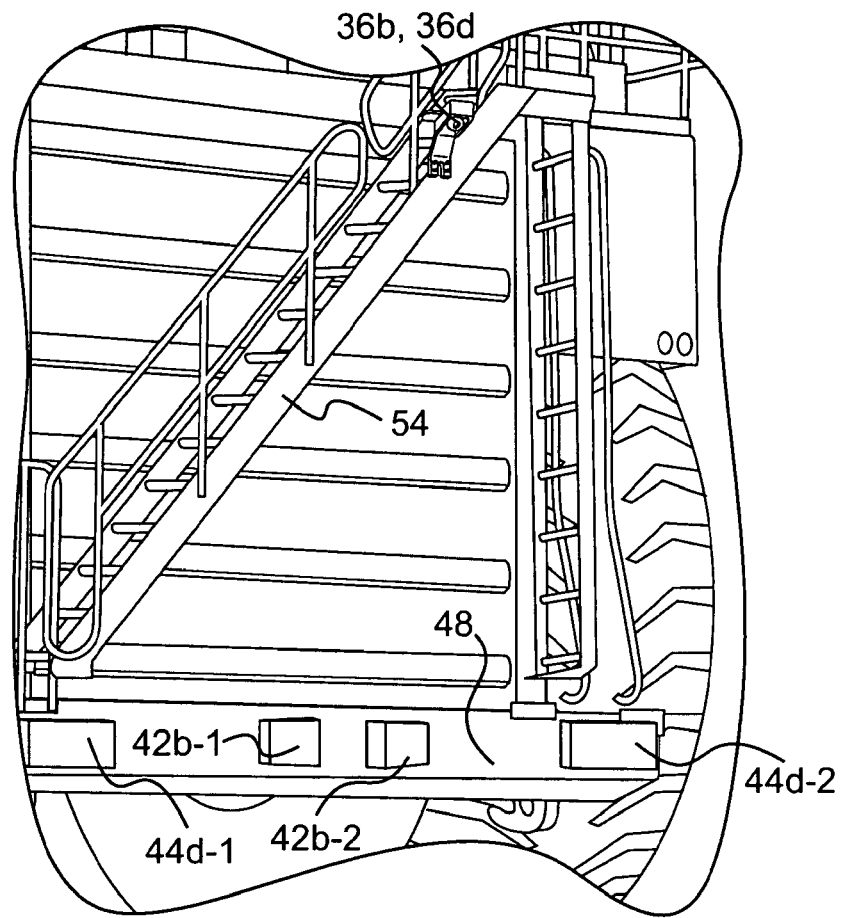
FIG. 5 is a pictorial illustration of exemplary disclosed medium range sensors, exemplary disclosed proximity sensors, and exemplary disclosed cameras for use with the obstacle detection systems of FIG. 4.
Figure 5:
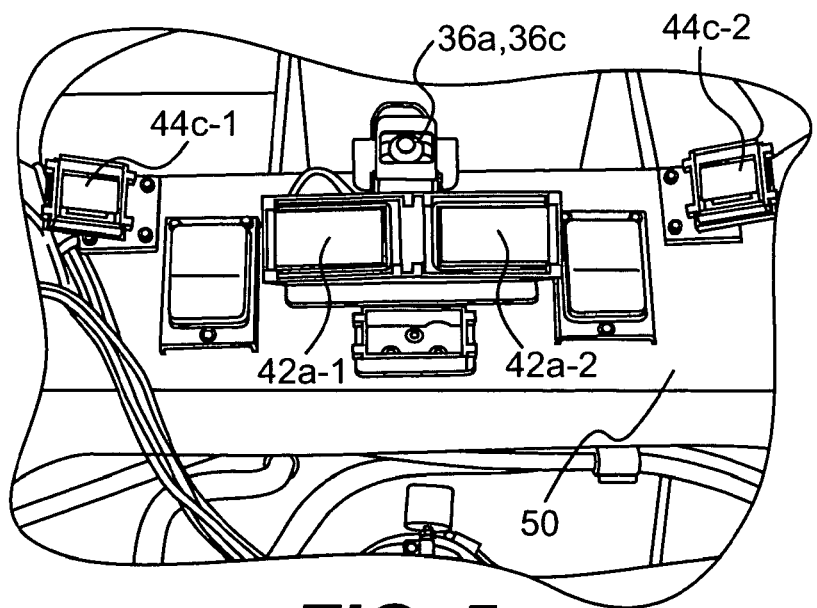

As illustrated in FIG. 5, medium range sensors 42b-1 and 42b-2 may be attached to a bumper 48 of machine 10, and situated to detect obstacle 12 within blind spot 28b. And, medium range sensors 42a-1 and 42a-2 may be attached to a rear support 50 of machine 10, and situated to detect obstacle 12 within blind spot 28a. Each medium range sensor 42 may embody a device that detects and ranges (i.e. determines relative locations of) surface points. For example, each medium range sensor 42 may be a LIDAR (light detection and ranging) device, RADAR (radio detection and ranging) device, SONAR (sound navigation and ranging) device, vision based sensing device, or another type of device that may detect and range surface points. Medium range sensors 42 may be configured to detect and range surface points that are between approximately 5 and 20 meters from machine 10. And, medium range sensors 42 may also be configured to generate and communicate to controllers 40 signals corresponding to these detections.

Also illustrated in FIG. 5, proximity sensors 44c-1 and 44c-2 may be attached to rear support 50 of machine 10, and situated to detect obstacle 12 within blind spot 28c. And, proximity sensors 44d-1 and 44d-2 may be attached to bumper 48 of machine 10, and situated to detect obstacle 12 within blind spot 28d. Each proximity sensor 44 may embody a device that detects and ranges (i.e. determines relative locations of) surface points. For example, each proximity sensor 44 may be a LIDAR (light detection and ranging) device, RADAR (radio detection and ranging) device, SONAR (sound navigation and ranging) device, vision based sensing device, or another type of device that may detect and range surface points. Proximity sensors 44 may be configured to detect and range surface points that are within approximately 5 meters of machine 10. And, proximity sensors 44 may also be configured to generate and communicate to controllers 40 signals corresponding to these detections.

Figure 6:
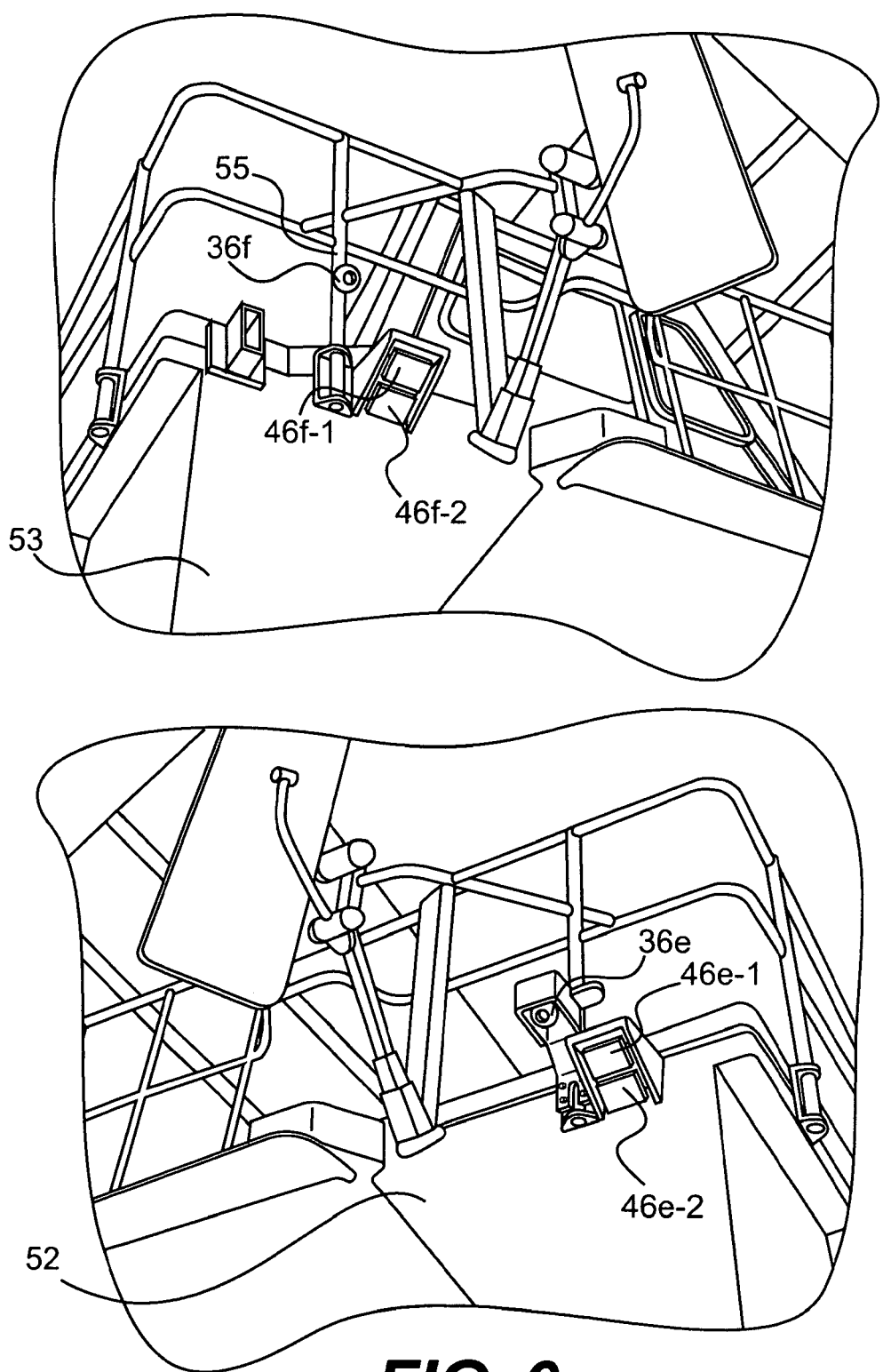
FIG. 6 is a pictorial illustration of exemplary disclosed downward facing sensors and exemplary disclosed cameras for use with the obstacle detection systems of FIG. 4.

As illustrated in FIG. 6, downward facing sensors 46e-1 and 46e-2 may be attached to a quarter panel 52 of machine 10, and situated to detect obstacle 12 within blind spot 28e. And, downward facing sensors 46f-1 and 46f-2 may be attached to a quarter panel 53 of machine 10, and situated to detect obstacle 12 within blind spot 28f. Each downward facing sensor 46 may embody a device that detects and ranges (i.e. determines relative locations of) surface points. For example, each downward facing sensor 46 may be a LIDAR (light detection and ranging) device, RADAR (radio detection and ranging) device, SONAR (sound navigation and ranging) device, vision based sensing device, or another type of device that may detect and range surface points. Downward facing sensors 46 may be configured to detect and range surface points that are within approximately 5 meters of machine 10. These surface points may include ground surface points. And, downward facing sensors 46 may also be configured to generate and communicate to controllers 40 signals corresponding to these detections.

Each controller 40 may include means for monitoring, recording, storing, indexing, processing, and/or communicating information. These means may include, for example, a memory, one or more data storage devices, a central processing unit, and/or another component that may receive surface point detections from obstacle sensors 39, and then communicate a signal indicative of dangerous obstacle 12 detections to controller 30.

As previously discussed, each blind spot 28 may also be associated with one camera 36, which may capture images of dangerous obstacle 12. For example, each camera 36 may embody a video camera, or another device operable to capture, and communicate images. Referring to FIG. 5, camera 36b (alternatively referred to as camera 36d) may be mounted on stairs 54 to view blind spots 28b and 28d, and camera 36a (alternatively referred to as camera 36c) may be mounted on rear support 50 to view blind spots 28a and 28c. Additionally, referring to FIG. 6, camera 36e may be mounted on quarter panel 52 to view blind spot 28e. And, camera 36f may be mounted on railing 55 to view blind spot 28f. Each camera 36 may generate and communicate to controller 30 a signal corresponding to captured images. It is contemplated that controller 30 may communicate with operator interface 38 to display these captured images to the operator.

Figure 7:
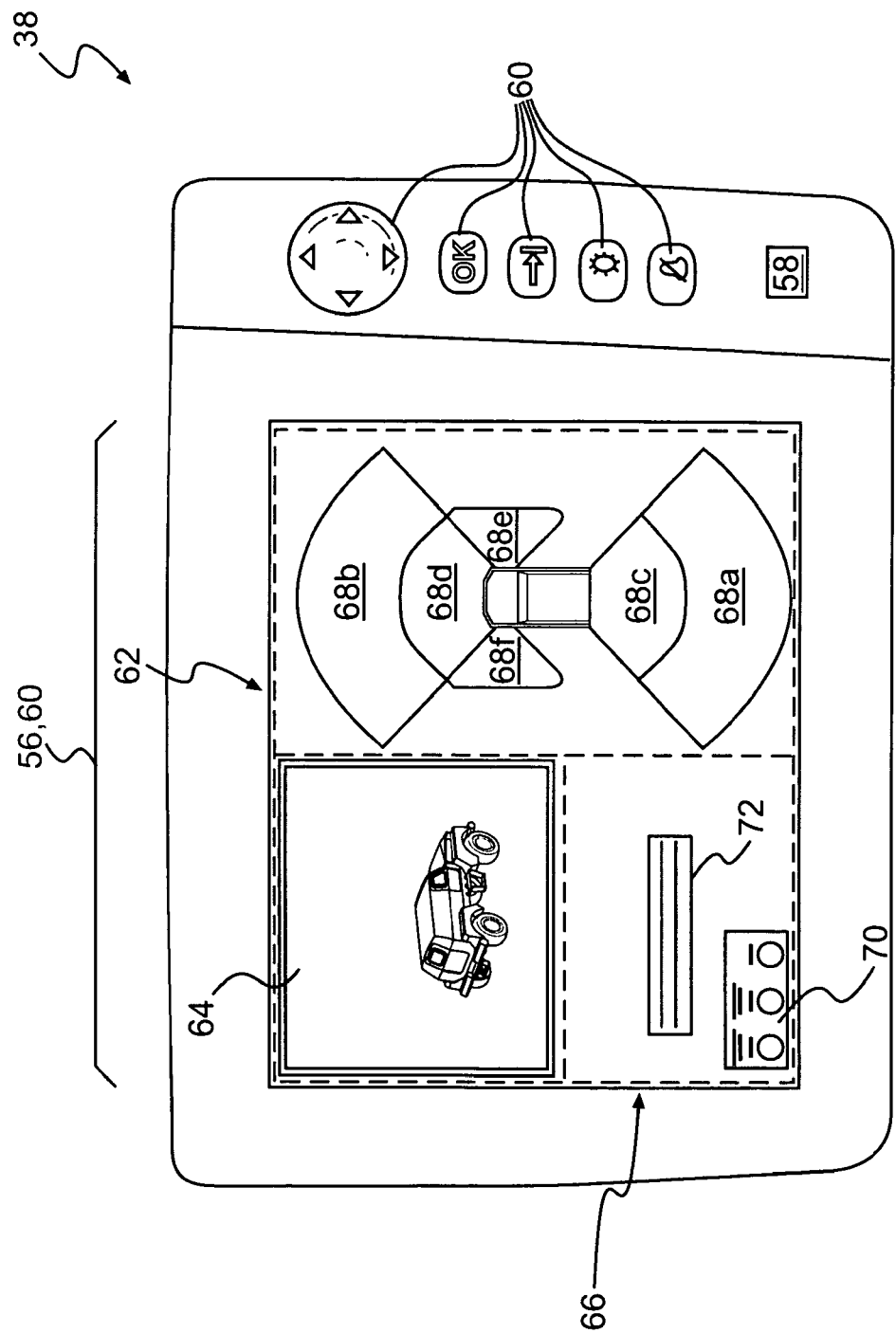
FIG. 7 is a pictorial illustration of an exemplary disclosed operator interface operating in an exemplary disclosed mixed mode, for use with the control system of FIG. 2.

Operator interface 38 may be situated within operator station 24 (referring to FIG. 1) and may be viewable, and operable by the operator. For example, operator interface 38 may be mounted to a dashboard (not shown) of machine 10 within reach of the operator. As illustrated in FIG. 7, operator interface 38 may include a display 56 to display the captured images. Display 56 may also display a visual representation of map 32. Controller 30 may use this visual representation of map 32 to provide a dangerous obstacle 12 warning to the operator. Alternatively or additionally, operator interface 38 may include a warning device 58 to provide a dangerous obstacle 12 warning to the operator. Warning device 58 may embody, for example, an alarm; a horn; an odorant or tissue-irritating substance dispenser; or another device operable to provide a warning to the operator. Operator interface 38 may also include an input device 60 to receive a selection from the operator. This selection may serve to acknowledge the operator's recognition of a provided dangerous obstacle 12 warning. Input device 60 may embody, for example a rocker switch, a hat switch, a joystick, a button, and/or another device capable of receiving a selection from the operator and generating a corresponding signal. Alternatively, display 56 and input device 60 may together embody a single integral component such as, for example, a touch-screen.

Display 56 may embody, for example, a monitor, an LCD screen, a plasma screen, a screen of a handheld device, or another device capable of communicating visual information to the operator. It is contemplated that controller 30 may operate display 56 in one or more modes corresponding to varied machine 10 operations. For example, a mixed mode may be utilized during normal operations to provide to the operator a wide breadth of information. When dangerous obstacle 12 is detected within a certain blind spot 28, a camera mode may be utilized to provide to the operator focused information regarding that certain blind spot 28. The operator may activate camera mode via input device 60 in response to a provided dangerous obstacle 12 warning, thereby acknowledging the dangerous obstacle 12 warning.

FIG. 7 illustrates display 56 operating in mixed mode. In mixed mode, controller 30 may devote a first portion 62 of display 56 to the visual representation of map 32. Controller 30 may devote a second portion 64 of display 56 to images captured by one camera 36 (hereafter "camera 36 images"). And, controller 30 may devote a third portion 66 of display 56 to collision avoidance system 29 status information.

Portion 62 may include icons 68a, 68b, 68c, 68d, 68e, and 68f, arranged and sized to represent blind spots 28a, 28b, 28c, 28d, 28e, and 28f, respectively. Controller 30 may vary the appearance of each icon 68 to indicate dangerous obstacle 12 detections within an associated blind spot 28. For example, controller 30 may change the color of icons 68. It is contemplated that controller 30 may also vary this color depending on the criticality of blind spot 28. Additionally, controller 30 may alter the appearance of each icon 68 to provide a dangerous obstacle 12 warning to the operator. For example, controller 30 may cause icons 68 to flash intermittently between two different colors. It is also contemplated that the color scheme used by controller 30 may vary depending on ambient light levels. For example, night and day color schemes may be defined by Table 4.

TABLE 4

|  | Night Color Scheme | | Day Color Scheme | |
| --- | --- | --- | --- | --- |
|  | Threatening | Non-Threatening | Threatening | Non-Threatening |
| Dangerous Obstacle not Detected within Blind Spot | Black | Black | Black | Black |
| Dangerous Obstacle Detected within Blind Spot | Warning | Black/Blue | Not Applicable | Black/Red | Not Applicable |
| | No Warning | Blue | Green | Red | Yellow |

As previously discussed, portion 64 may be devoted to camera 36 images. Specifically, portion 64 may communicate camera 36 images. It is contemplated that controller 30 may automatically select which camera 36 images are communicated (i.e. controller 30 may automatically determine which camera 36 captures the images that are displayed). It is also contemplated that the operator may indirectly via input device 60 and controller 30 select which camera 36 images are displayed.

Portion 66 may include an indicator 70 and a text box 72, each configured to communicate a status of collision avoidance system 29. In particular, controller 30 may vary the appearance of indicator 70 to indicate the color scheme of portion 62. For example, controller 30 may change the color of indicator 70. Controller 30 may display indicator 70 as red when the color scheme of portion 62 is night, and as green when the color scheme of portion 62 is day. Controller 30 may also communicate information to the operator via text box 72. For example, controller 30 may communicate text regarding which camera 36 images are selected.

Figure 8:
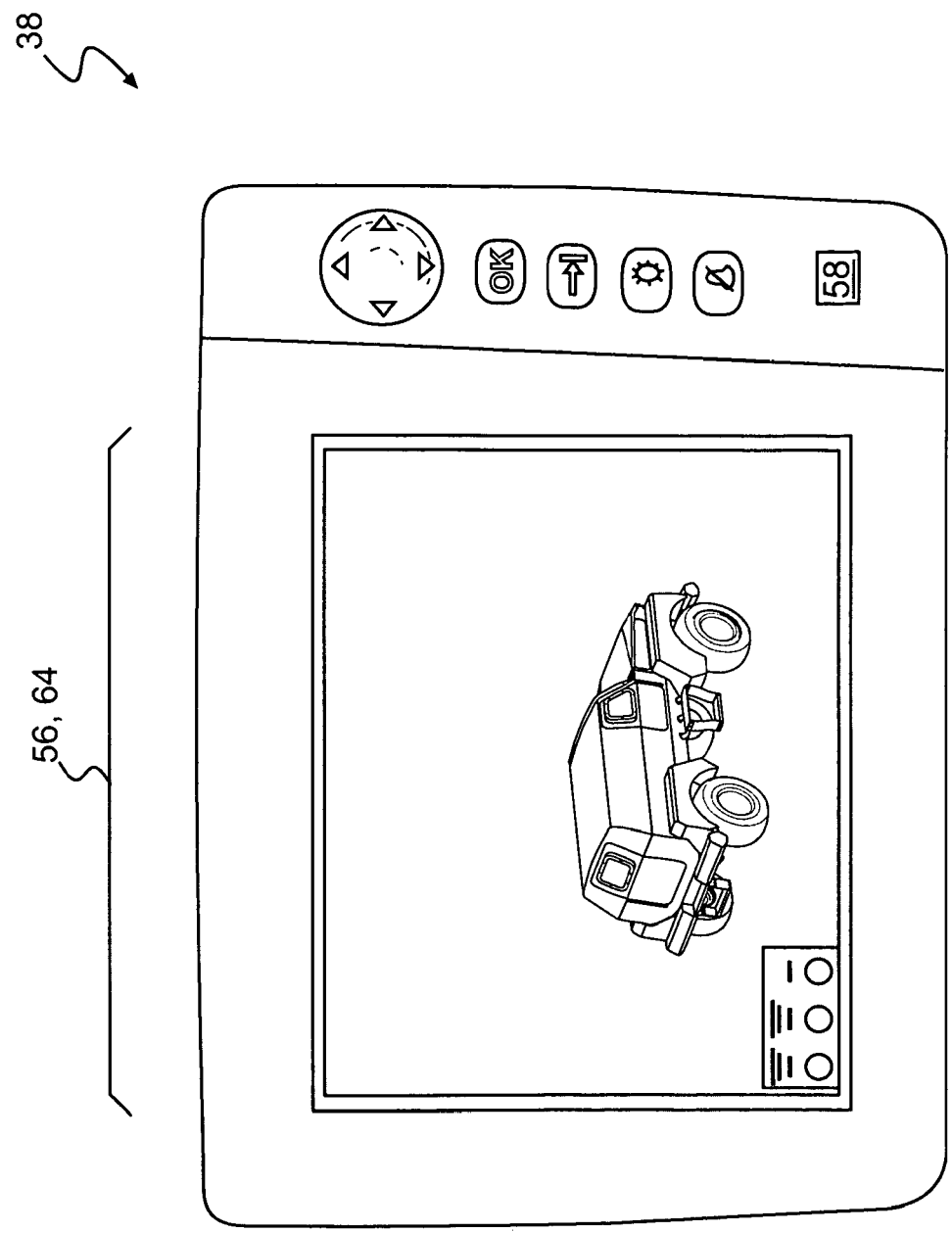
FIG. 8 is a pictorial illustration of the operator interface of FIG. 7 operating in an exemplary disclosed camera mode.

As previously discussed, when obstacle 12 is detected within a certain blind spot 28, camera mode may be utilized to provide to the operator focused information regarding that certain blind spot 28. FIG. 8 illustrates display 56 operating in camera mode. In camera mode, controller 30 may increase a relative size of portion 64. It is contemplated that camera 36 images may thereby be displayed at a higher resolution, allowing the operator to view dangerous obstacle 12 details, for example, license plate numbers.

Figure 9:
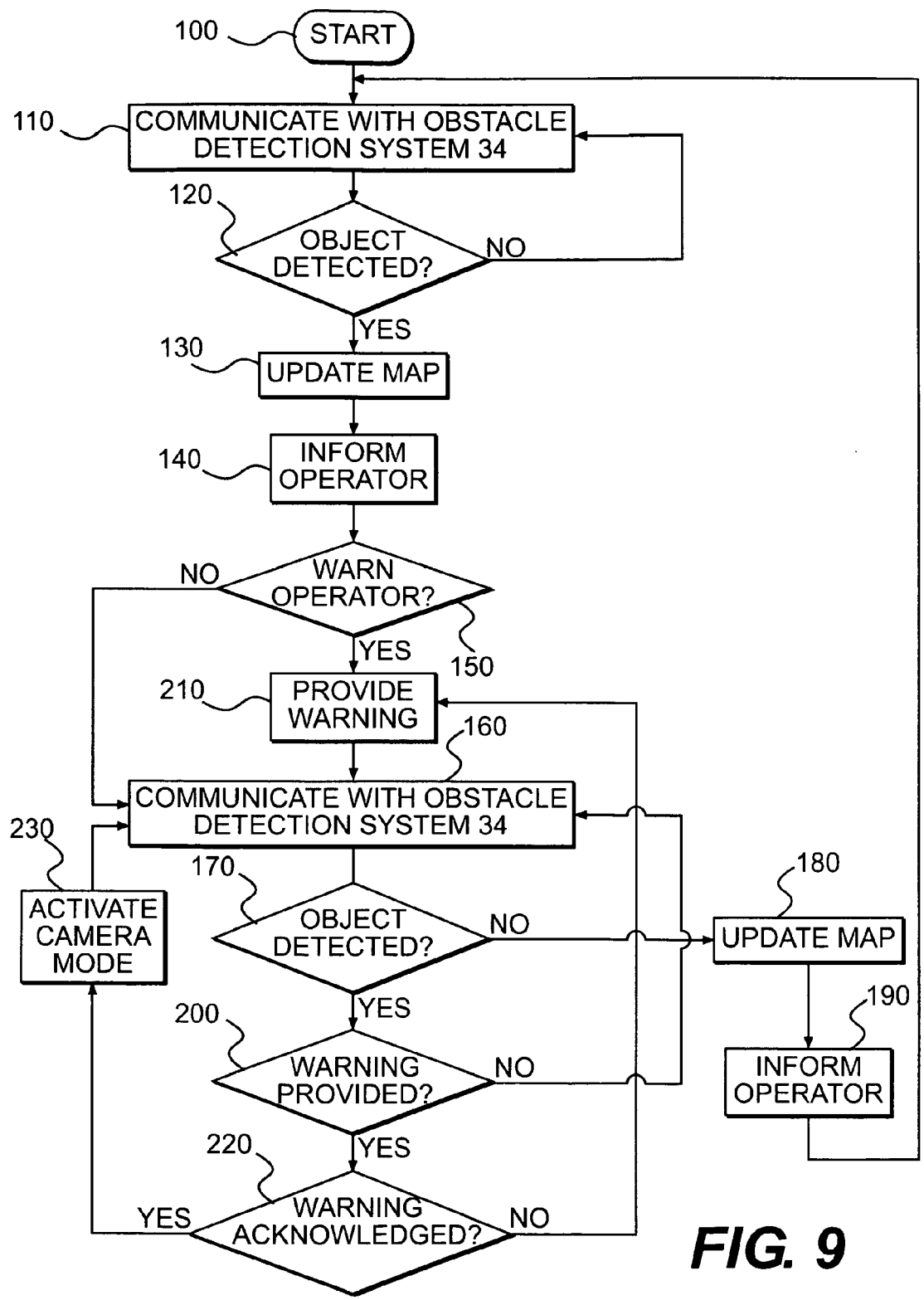
FIG. 9 is a flow chart describing an exemplary method of operating the control system of FIG. 2.

FIG. 9 illustrates an exemplary method of operating collision avoidance system 29. FIG. 9 will be discussed in the following section to further illustrate collision avoidance system 29 and its operation.

INDUSTRIAL APPLICABILITY

The disclosed collision avoidance system may be applicable to machines, which may intermittently move between and stop at certain locations within a worksite. The system may detect information about an obstacle within a blind spot of the machine, and report this information to an operator of the machine. In particular, the disclosed system may detect a presence of a dangerous obstacle within the blind spot, and warn the operator of this presence. Operation of the system will now be described.

As illustrated in FIG. 9, operation of collision avoidance system 29 may commence at a step 100, which may include initialization of controller 30. Controller 30 may then communicate with obstacle detection system 34 (step 110), which may determine whether dangerous obstacle 12 is detected within blind spot 28 (step 120). If dangerous obstacle 12 is not detected within blind spot 28, controller 30 may return to step 110 and again communicate with obstacle detection system 34.

The initialization of step 100 may involve populating default values. It is contemplated that this initialization may be performed during installation of collision avoidance system 29. In particular, the criticality values associated with each blind spot 28 may be defined. The camera 36 images, which are communicated via display 56 at machine startup, may also be selected. It is contemplated that after machine startup, the operator may via input device 60 select other camera 36 images for communication via display 56. For example, if display 56 and input device 60 together embody a touch screen, the operator may touch one icon 68. Controller 30 may determine that this icon 68 represents a certain blind spot 28. Controller 30 may then select camera 36 images associated with this certain blind spot 28. Moreover, after machine startup, the operator may via input device 60 activate camera mode to obtain focused information regarding one blind spot 28. During the initialization, the color scheme of portion 62 may also be selected. This color scheme may be altered after machine startup, based upon ambient light levels.

For example, when ambient light levels decrease below a certain level, controller 30 may switch from using the day color scheme to the night color scheme. Alternatively, the initialization may be performed at a service interval of machine 10, or during operation of collision avoidance system 29.

The communication of step 110 may involve one or more obstacle detection systems 34. It is contemplated that controller 30 may communicate with one obstacle detection system 34 at a time. For example, controller 30 may communicate with obstacle detection system 34a. Controller 30 may then complete steps 120-230 based on this communication with obstacle detection system 34a. Next, controller 30 may communicate with obstacle detection system 34b. Controller 30 may then complete steps 120-230 based on this communication with obstacle detection system 34b. It is contemplated that controller 30 may then again communicate with obstacle detection system 34a or another obstacle detection system 34. Alternatively, controller 30 may simultaneously communicate with a plurality of obstacle detection systems 34. For example, controller 30 may simultaneously communicate with obstacle detection systems 34a and 34b. Controller 30 may then complete steps 120-230 based on these communications with obstacle detections systems 34a and 34b. Specifically, controller 30 may complete steps 120-230 based on the communication with obstacle detection system 34a. Simultaneously, controller 30 may also complete steps 120-230 based on the communications with obstacle detection system 34b.

The communications of step 110 may include detection values determined by each obstacle detection system 34 during step 120. As previously discussed, detection value 1 may correspond to a dangerous obstacle 12 detection, while detection value 0 may correspond to a dangerous obstacle 12 non-detection. The determination of step 120 may include sub-steps. For example, each obstacle detection system 34, and more specifically, each obstacle sensor 39 may scan (i.e. detect points within) blind spot 28. Each obstacle sensor 39 may then communicate data regarding these scans (i.e. the raw locations of the points) to controller 40. Controller 40 may aggregate the raw locations of the points and then determine an attribute of at least one obstacle 12. In particular, controller 40 may apply a height filter to the points, thereby removing ground surfaces. Next, controller 40 may filter out the points on surfaces of obstacles 12 that are not dangerous. Specifically, controller 40 may filter out the points that represent transient (unstable) RADAR returns. For example, the points that are detected for not more than a sustained period of five-hundred milliseconds may be filtered out. The points that remain may be classified as dangerous obstacles 12. Alternatively, controller 40 may filter out obstacles 12 that are not a certain size. Controller 40 may convert the height filtered points into obstacles 12 through blob extraction, which is known in the art of computer graphics. Controller 40 may then apply a size filter to obstacles 12. Specifically, controller 40 may filter out obstacles 12 that have height 16 not longer than length 22, width 18 not longer than length 22, and depth 20 not longer than length 22 (referring to FIG. 1). By filtering out these obstacles 12, only dangerous obstacles 12 may remain. The filtering may be accomplished by first calculating height 16, width 18, and depth 20. The longest of height 16, width 18, and depth 20 may then be compared to length 22. If the longest of height 16, width 18, and depth 20 is not longer than length 22, obstacle 12 may be filtered out. But, if the longest of height 16, width 18, and depth 20 is longer than length 22, obstacle 12 may be retained and classified as dangerous.

Each obstacle detection system 34, and more specifically, each controller 40 may then generate and communicate to controller 30 a signal corresponding to detection value 0 or 1. In particular, if any points and/or obstacles 12 have been classified as dangerous obstacles 12, controller 40 may generate and communicate to controller 30 a signal corresponding to detection value 1. Otherwise, controller 40 may generate and communicate to controller 30 a signal corresponding to detection value 0.

If controller 30 receives a signal corresponding to detection value 0, controller 30 may return to step 110 and again communicate with obstacle detection system 34. But, if controller 30 receives a signal corresponding to detection value 1 (i.e. dangerous obstacle 12 is detected within blind spot 28), controller 30 may update map 32, based on the detection (step 130). Controller 30 may then inform the operator of the detection by updating the visual representation of map 32 communicated via display 56 (step 140). Simultaneously with or after step 140, controller 30 may determine whether to warn the operator of the dangerous obstacle 12 detection (step 150). If a dangerous obstacle 12 warning is not required, controller 30 may again communicate with obstacle detection system 34 (step 160), which may again determine whether dangerous obstacle 12 is detected within blind spot 28 (step 170). Steps 160 and 170 may be equivalent to steps 110 and 120, respectively. If at step 170 dangerous obstacle 12 is not detected within blind spot 28, controller 30 may update map 32, based on the non-detection (step 180). Controller 30 may then inform the operator of the non-detection by updating the visual representation of map 32 communicated via display 56 (step 190). Controller 30 may then return to step 110 and again communicate with obstacle detection system 34.

The informing of step 140 may include sub-steps. Controller 30 may activate mixed mode (referring to FIG. 7), if display 56 is operating in camera mode. Next, controller 30 may vary the appearance of one icon 68 to indicate the detection of dangerous obstacle 12 within blind spot 28. In particular, controller 30 may vary the appearance of icon 68 in accordance with the selected color scheme and Table 4. For example, if the day color scheme is selected, icon 68 may be shown as red or yellow. Icon 68 may be shown as red if blind spot 28 has a criticality value of 1 (i.e. dangerous obstacle 12 is threatening), while icon 68 may be shown as yellow if blind spot 28 has a criticality value of 0 (i.e. dangerous obstacle 12 is not threatening). Additionally, controller 30 may select which camera 36 images are communicated via portion 64 of display 56, based on the dangerous obstacle 12 detection. For example, if dangerous obstacle 12 is detected within blind spot 28a, controller 30 may select camera 36a. Alternatively, the selection by controller 30 of which camera 36 images are communicated may be included in step 210, discussed below.

The determination of whether to warn the operator of the dangerous obstacle 12 detection (step 150) may be based upon the criticality value of blind spot 28. For example, a warning may be required if blind spot 28 has a criticality value of 1, while a warning may not be required if blind spot 28 has a criticality value of 0.

Similar to the informing of step 140, the informing of step 190 may also include sub-steps. Controller 30 may activate mixed mode (referring to FIG. 7), if display 56 is operating in camera mode. Next, controller 30 may vary the appearance of one icon 68 to indicate the non-detection of dangerous obstacle 12 within blind spot 28. In particular, controller 30 may vary the appearance of icon 68 in accordance with the selected color scheme and Table 4. For example, if the day color scheme is selected, icon 68 may be shown as black.

If at step 170 dangerous obstacle 12 is detected within blind spot 28, controller 30 may determine whether at step 150 controller 30 determined that a warning was required (step 200). If at step 150, controller 30 determined a warning was not required, controller 30 may return to step 160 and again communicate with obstacle detection system 34.

If at step 150 controller 30 determines that a warning is required, controller 30 may provide a dangerous obstacle 12 warning to the operator (step 210). This warning may be provided via display 56. Specifically, controller 30 may alter the appearance of one icon 68 to warn the operator of the detection of dangerous obstacle 12 within blind spot 28. In particular, controller 30 may alter the appearance of icon 68 in accordance with the selected color scheme of Table 4. For example, if the day color scheme is selected, icon 68 may flash intermittently between black and red. Additionally or alternatively, controller 30 may activate warning device 58 to provide the dangerous obstacle 12 warning to the operator. Controller 30 may also select which camera 36 images are communicated via portion 64 of display 56, based on the dangerous obstacle 12 detection. For example, if dangerous obstacle 12 is detected within blind spot 28a, controller 30 may select camera 36a. Controller 30 may then again communicate with obstacle detection system 34 (step 160), which may again determine whether dangerous obstacle 12 is detected within blind spot 28 (step 170). If dangerous obstacle 12 is not detected within blind spot 28, controller 30 may update map 32 based on the non-detection, as previously discussed (step 180).

If at step 150 controller 30 determined that a warning was required and at step 170 dangerous obstacle 12 is detected, controller 30 may determine whether the operator has acknowledged the dangerous obstacle 12 warning provided at step 210 (hereafter the "first dangerous obstacle 12 warning") (step 220). It is contemplated that the operator may acknowledge the first dangerous obstacle 12 warning by making a selection via input device 60. Therefore, if the operator has not made a selection via input device 60, the operator may not have acknowledged the first dangerous obstacle 12 warning. If the operator has not acknowledged the first dangerous obstacle 12 warning, controller 30 may return to step 210 and provide a second dangerous obstacle 12 warning to the operator.

If at step 220 controller 30 determines that the operator has acknowledged the first dangerous obstacle 12 warning, controller 30 may respond to the operator's selection. For example, controller 30 may activate camera mode (step 230). Controller 30 may also deactivate warning device 58. Controller 30 may then return to step 160 and again communicate with obstacle detection system 34.

It is contemplated that collision avoidance system 29 may detect a dangerous obstacle 12 that is relatively motionless with respect to machine 10. Specifically, obstacle sensors 39 may detect surface points of dangerous obstacle 12 regardless of whether it is relatively motionless with respect to machine 10. By detecting these surface points, obstacle sensors 39 may enable obstacle detection system 34 to detect dangerous obstacle 12. Controller 30 may then warn the operator of dangerous obstacle 12 via operator interface 38. This warning may increase the likelihood of the operator recognizing the presence of dangerous obstacle 12. It is also contemplated that controller 30 may ensure the operator recognizes the presence of dangerous obstacle 12. Specifically, controller 30 may repeatedly warn the operator of dangerous obstacle 12 until the operator acknowledges the warning by making a selection via input device 60.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method for collision avoidance for a machine, comprising:
   detecting an obstacle with an obstacle detection system and generating a corresponding signal, the obstacle detection system including an operator input device;
   providing an obstacle detection warning in response to the signal, wherein providing the obstacle detection warning includes displaying a graphic on a first portion of a display; capturing images of the obstacle with a camera and displaying the images on a second portion of the display; and
   determining with a controller whether the operator input device has been activated in response to the obstacle detection warning.

2. The method of claim 1, wherein the obstacle detection warning is a first obstacle detection warning, and further providing a second obstacle detection warning based on the controller's determination of whether the operator input device has been activated in response to the first obstacle detection warning.

3. The method of claim 1, further including varying the graphic based on a distance between the obstacle and the machine sensed by the obstacle detection system.

4. The method of claim 3, wherein varying the graphic includes varying a color of the graphic.

5. The method of claim 1, further comprising providing an audible warning in response to the signal.

6. The method of claim 1, wherein the camera is a first camera configured to view a first blind spot, and further including capturing images with a second camera configured to view a second blind spot and displaying the images on the second portion of the display.

7. The method of claim 1, wherein detecting the obstacle includes determining a height of the obstacle.

8. The method of claim 7, wherein detecting the obstacle further includes determining a width and a depth of the obstacle.

9. The method of claim 8, further including comparing the height, width, and depth of the obstacle to a threshold height, width, and depth.

10. The method of claim 1, wherein the operator input device is a touch screen or a button.

11. The method of claim 1, wherein detecting the obstacle includes comparing a size of the obstacle to a threshold.

12. A collision avoidance system for a machine, comprising:
    an obstacle detection system configured to detect an obstacle and generate a corresponding signal, the obstacle detection system including an operator input device;
    a controller configured to;
    provide an obstacle detection warning in response to the signal, wherein providing the obstacle detection warning includes displaying a graphic on a first portion of a display;
    receive images of the obstacle and display the images on a second portion of the display; and determine with a controller whether the operator input device has been activated in response to the obstacle detection warning.

13. The system of claim 12, wherein the controller is further configured to vary the graphic based on a distance between the obstacle and the machine sensed by the obstacle detection system.

* * * * *

UNITED STATES PATENT AND TRADEMARK OFFICE
CERTIFICATE OF CORRECTION

PATENT NO. : 8,423,280 B2  
APPLICATION NO. : 13/572279  
DATED : April 16, 2013  
INVENTOR(S) : Edwards et al.

Page 1 of 1

It is certified that error appears in the above-identified patent and that said Letters Patent is hereby corrected as shown below:

On Title page 2, item (56) Column 2, (Other Publications), line 38, delete "(Feb. 2008)" and insert -- (Feb. 2006) --.

In the Specification

Column 1, line 3, delete "12/081,350" and insert -- 12/081,350, --.

Column 1, line 4, delete "8,280,621" and insert -- 8,280,621, --.

In the Claims

Column 12, line 61, in Claim 12, delete "configured to;" and insert -- configured to: --.

Signed and Sealed this
Eleventh Day of August, 2015

Michelle K. Lee
*Director of the United States Patent and Trademark Office*